United States Patent
Fisher (10) Patent No.: US 6,874,405 B2
(45) Date of Patent: Apr. 5, 2005

(54) BREATHER FILTER FOR SEALED SPRING BRAKE ACTUATORS

(75) Inventor: Albert D. Fisher, Kansas City, MO (US)

(73) Assignee: Haldex Brake Corporation, Kansas City, MO (US)

( * ) Notice: Subject to any disclaimer, the term of this patent is extended or adjusted under 35 U.S.C. 154(b) by 81 days.

(21) Appl. No.: 10/341,911

(22) Filed: Jan. 14, 2003

(65) Prior Publication Data

US 2004/0134344 A1 Jul. 15, 2004

(51) Int. Cl.⁷ ............................................. F15B 15/22
(52) U.S. Cl. .................................... 92/17; 92/78
(58) Field of Search ........................... 92/17, 78

(56) References Cited

U.S. PATENT DOCUMENTS

| | | | | |
|---|---|---|---|---|
| 3,187,642 A | * | 6/1965 | Cruse .............................. | 92/63 |
| 3,217,611 A | * | 11/1965 | Leighton ........................ | 92/63 |
| 3,896,706 A | | 7/1975 | Newstead et al. .............. | 92/63 |
| 4,259,895 A | | 4/1981 | Owens ........................... | 92/78 |
| 4,283,992 A | | 8/1981 | Wilson .......................... | 91/369 |
| 4,890,540 A | | 1/1990 | Mullins ......................... | 92/63 |
| 5,123,330 A | | 6/1992 | Roether ......................... | 91/1 |
| 5,263,403 A | | 11/1993 | Choinski ....................... | 92/63 |
| 5,311,809 A | | 5/1994 | Choinski et al. ............... | 92/63 |
| 5,372,059 A | | 12/1994 | Pierce et al. ................... | 92/48 |
| 5,632,192 A | | 5/1997 | Plantan et al. .................. | 92/5 |
| 5,937,733 A | | 8/1999 | Stojic ............................ | 92/63 |

* cited by examiner

*Primary Examiner*—F. Daniel Lopez
(74) *Attorney, Agent, or Firm*—St. Onge Steward Johnston & Reens LLC (57) ABSTRACT

A brake actuator assembly includes a housing defining a spring chamber. A spring is disposed in the spring chamber, the spring being biased toward an extended position and movable against the bias toward a caged position. A release assembly is provided for selectively moving and retaining the spring against the bias toward the caged position, the release assembly comprising a hollow release bolt having a fluid passage passing therethrough by which fluid passage the spring chamber is in fluid communication with an environment surrounding the housing. A filter is disposed within the fluid passage in the hollow release bolt for filtering fluid passing through the fluid passage.

18 Claims, 6 Drawing Sheets

BREATHER FILTER FOR SEALED SPRING BRAKE ACTUATORS

FIELD OF THE INVENTION

The present invention relates generally to spring brake actuators for vehicles and particularly diaphragm- or piston-style spring brake actuators.

BACKGROUND OF THE INVENTION

An air brake system for a vehicle such as a bus, truck or the like typically includes a brake actuator assembly which is actuated by means of an actuator assembly operated by the selective application of a fluid such as compressed air. Conventional air brake actuators typically have both a service brake actuator for actuating the brakes under normal driving conditions by the application of compressed air and an emergency or spring brake actuator which causes actuation of the brakes when air pressure has been released. The spring brake actuator can be used as a parking brake or emergency brake in the event that the air pressure system fails. The spring brake actuator includes a compression spring which forces application of the brake when fluid or air pressure is either released or lost. Typically, the spring brake actuator is disposed in tandem with the service brake actuator.

The service chamber which houses the service break actuator is typically divided into two chambers by a diaphragm. Depressing the brake pedal during normal driving operation introduces compressed air or fluid into one of the chambers of the service brake actuator which, acting against the diaphragm, causes a service brake push rod in the opposite chamber to be extended and the brakes to be applied with an application force proportional to the air pressure in the service brake actuator.

Like the service chamber, the spring brake actuator is typically divided into two chambers, a pressurized chamber and a non-pressurized chamber, separated by a rubber diaphragm and pressure plate, with the spring in the non-pressurized chamber acting between an end wall of the spring brake housing and the pressure plate. When compressed air or fluid is introduced to the pressurized chamber, air or fluid pressure acting against the diaphragm and pressure plate compresses the spring in the non-pressurized chamber.

In the event of a loss of air or fluid pressure or an intentional exhaustion of air or fluid from the spring brake actuator, the spring brake will be mechanically activated by the force of the compression spring acting on the spring brake actuator rod which, in turn, acts upon the brake push rod to apply the brakes. Thus, the spring brake portion serves both as a parking brake and an emergency brake. Because the force generated by the compression spring is quite large, it can be dangerous to service the spring brake if the spring has not been properly restrained. For safety purposes during servicing, some spring brake actuators include a release bolt and nut assembly that can be adjusted to retain the spring in a fixed and safe position during surfacing of the brake.

When air or fluid pressure is released from the spring brake actuator, the spring and diaphragm extend significantly, expanding the volume of the spring brake actuator non-pressurized chamber containing the spring. A pressure vacuum is then created in the chamber by the expanding volume of the non-pressurized chamber, so means must be provided to allow air to enter into the expanded volume of the non-pressurized chamber from the outside environment. Conversely, when the spring is retracted, and the volume of the non-pressurized chamber contracts, means must be provided for evacuating air from the chamber.

In many prior brake actuators, the chamber containing the spring is simply open to the outside environment and atmosphere through ports or vents in the chamber housing. However, this allows dirt, salt, moisture and other unwanted material and contaminants from the environment outside the brake chamber to enter that chamber through the ports. Some prior art brake designs have used complex arrangements of valves and fluid conduits to permit fluid flow to the spring brake chamber from other chambers in the brake actuator assembly. These arrangements require extra components and complex machining of the components. Other prior art brake actuators have used external filters placed over the vent holes and attached to the outside of the brake actuator housing to prevent contaminants from entering the brake chambers. However, external filters require additional space, components, machining and assembly effort.

Prior art brake actuators include U.S. Pat. No. 5,937,773 which discloses a spring brake actuator with an internal breathing conduit made up of a series of complicated weep holes in the spring brake housing, the spring brake actuator rod and the sleeve of the push rod. This series of weep or vent holes fluidly connects the unpressurized chambers of the brake with the outside environment. The fluid which enters and exits the brake actuator through the external vent hole passes through a filter assembly that attaches to the exterior of the spring brake housing and covers the external vent hole filtering fluid passing in and out of the spring brake.

U.S. Pat. No. 5,632,192 issued to Plantan et al. discloses a spring brake actuator which includes an indicator system incorporated into a release tool therefor. The indicator provides an indication of when the release tool has is fully released. The release tool is of the type wherein a threaded member does not extend outwardly of the actuator during caging of the power spring. The indicator is biased outwardly of the actuator when the release bolt has even partially caged the power spring. It is only when release bolt is fully released that the indicator is pulled inwardly. Thus, an observer has a visual indication of when the power spring caging mechanism has been fully released. However, this reference does not disclose any type of filter or vent system at all.

U.S. Pat. Nos. 5,263,403 and 5,311,809 issued to Choinski et al. disclose a brake actuator having a non-pressurized spring brake chamber and a non-pressurizing service brake chamber fluidly interconnected by a breather tube mounted on the outside of the brake actuator housing.

U.S. Pat. No. 4,890,540 issued to Mullins discloses a brake actuating unit having a housing with a pair of vent holes wherein the lower vent hole is left completely open to the outside environment without a cap or filter while only the upper vent hole is sealed to prevent contaminants from entering the housing.

U.S. Pat. No. 3,896,706 issued to Newstead discloses a brake unit having vent holes in the brake housing of the non-pressurized chamber that are covered by external filters that are attached to the outside of the brake housing.

U.S. Pat. No. 5,123,330 issued to Roether et al, U.S. Pat. No. 4,283,992 issued to Wilson and U.S. Pat. No. 4,259,895 issued to Owens all disclose assemblies having filters for outside air located within or adjacent to actuating cylinders.

All of the prior art references listed above suffer from a number of disadvantages, including the fact that complex filter designs are employed, that additional holes are required to be created in the housing, and/or that unsatisfactory filtering of contaminants is achieved.

SUMMARY OF THE INVENTION

Accordingly, it is an object of the present invention to provide a brake actuator assembly which permits air flow in and out of the actuator brake housing.

Another object of the present invention is to provide a brake actuator assembly having the above characteristics and which filters out unwanted contaminants from entering the actuator brake housing.

A further object of the present invention is to provide a brake actuator assembly having the above characteristics and which does not employ a complex filter design.

Still another object of the present invention is to provide a brake actuator assembly having the above characteristics and which does not require that additional holes be created in the housing.

Yet a further object of the present invention is to provide a brake actuator assembly having the above characteristics and which achieves satisfactory filtering of contaminants.

These and other objects of the present invention are achieved by provision of a brake actuator assembly including a housing defining a spring chamber. A spring is disposed in the spring chamber, the spring being biased toward an extended position and movable against the bias toward a caged position. A release assembly is provided for selectively moving and retaining the spring against the bias toward the caged position, the release assembly comprising a hollow release bolt having a fluid passage passing therethrough by which fluid passage the spring chamber is in fluid communication with an environment surrounding the housing. A filter is disposed within the fluid passage in the hollow release bolt for filtering fluid passing through the fluid passage. Preferably, the spring chamber is substantially air-tight except for the fluid passage in the hollow release bolt.

In certain embodiments, the release assembly comprises threads provided on an outer surface of the hollow release bolt, which threads cooperate with threads provided on an inner surface of a nut. In these cases, the spring is preferably moved and retained toward the caged position when the hollow release bolt is rotated with respect to the nut. In certain of these embodiments, the nut is fixedly mounted to the housing.

In certain embodiments, an indicator mechanism is provided which indicates whether the spring has been moved and retained toward the caged position. In certain of these embodiments, the indicator mechanism indicates to what extent the spring has been moved and retained toward the caged position. In certain embodiments, the indicator mechanism comprises threads provided on an outer surface of the hollow release bolt, which threads cooperate with threads provided on an inner surface of a nut. In certain of these embodiments, the nut is fixedly mounted to the housing. In certain embodiments, the hollow release bolt extends out beyond the housing when the spring has been moved and retained toward the caged position. In certain of these embodiments, an extent to which the hollow release bolt extends out beyond the housing indicates an extent to which the spring has been moved and retained toward the caged position.

The invention and its particular features and advantages will become more apparent from the following detailed description considered with reference to the accompanying drawings.

DETAILED DESCRIPTION OF THE INVENTION

Figure 1:
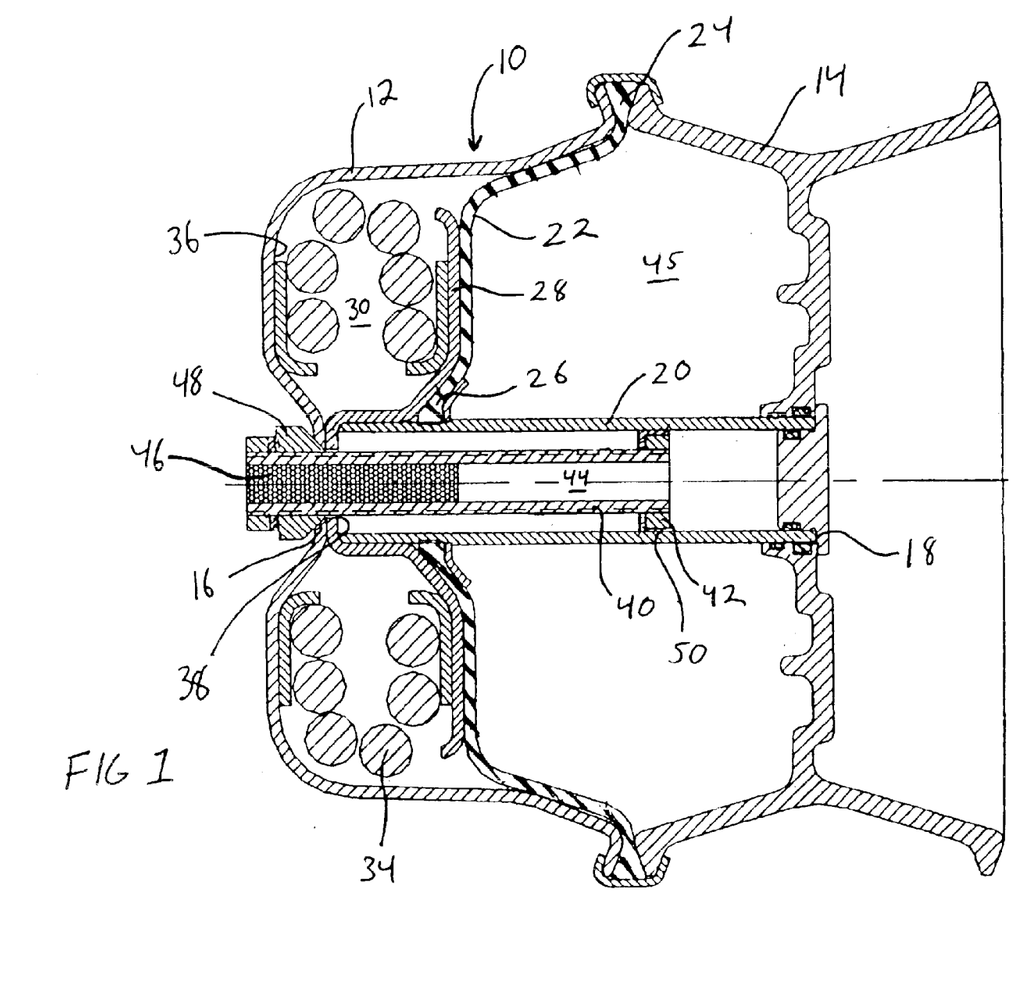
FIG. 1 is a cross-sectional view of a brake actuator assembly in accordance with an exemplary embodiment of the invention showing a release bolt in a fully disengaged position and with the power spring fully compressed by air applied to the pressure side of the diaphragm.

An exemplary embodiment of a brake actuator assembly in accordance with the invention is shown in FIG. 1. The brake actuator assembly includes a brake housing 10, which is formed of two portions, a spring break chamber or first proximal portion 12 and a second distal portion 14. The first proximal portion defines an aperture 16 in the proximal end of the housing 10 while the second distal portion defines an aperture 18 in the distal end of the housing 10. A sleeve 20 is slideably located at least partially within housing 10 and can move reciprocally from a retracted position within the housing to extended position outside the housing. A diaphragm 22 is attached between the sleeve 20 and the housing 10. In the disclosed embodiment, the diaphragm's outer periphery 24 is attached to the housing 10 where the first housing portion 12 and the second housing portion 14 meet. In the embodiment shown in FIG. 1, the diaphragm's inner periphery 26 is attached near the proximal end of sleeve 20 with spring retraction plate 28 which forms an assembly that moves with sleeve 20 as the sleeve reciprocates between a retracted (proximal) and extended (distal) position.

Within sleeve 20 is a release bolt 40 with one end that extends at least partially outside housing 10 through aperture 16 and second end to which collar 42 is attached. Release bolt 40 is hollow and has a channel therein at least partially defining a fluid passage 44 between the environment outside the brake housing 10 and the brake chamber 45 inside the brake housing 10. Inside the release bolt 40 and located in the fluid passage 44 is a filter element 46 for filtering contaminants from fluid that passes through the fluid passage 44.

The exterior or outer surface of release bolt 40 is at least partially threaded and is at least partially engaged with a nut 48 that is fixedly attached to the first housing portion 12 and at least partially defines the first aperture 16. The interior of inner surface of nut 48 is threaded to mate with the exterior threads on release bolt 40. Due to the mating threads of release bolt 40 and nut 48, the position of release bolt 40 relative to first housing portion 12 can be adjusted by simply rotating release bolt 40.

Collar 42 includes a fluid passage 50 to at least partially define a fluid path that allows fluid to pass by or through collar 42 (best seen in FIG. 7), as more fully described below. Collar 42 can also include a nylon bearing surface on the face of the collar that comes in contact with sleeve 20 and release plate 28 to reduce friction between the parts during rotation of the release bolt 40.

A spring chamber 30 is at least partially defined by the first housing portion 12, the diaphragm 22 and the spring release plate 28. Typically, the spring chamber 30 is unpressurized and houses a power spring 34. The spring 34 is located between the inner wall 36 of the housing's first proximal section 12 and the spring retraction plate 28. The brake chamber 45 is at least partially defined by distal housing portion 14 and the diaphragm/spring retraction plate/sleeve assembly. Typically, brake chamber 45 is pressurized by fluid pressure, in this embodiment by compressed air. When fluid is forced into the brake chamber 45, the fluid pushes the spring retraction plate/diaphragm/sleeve assembly in a distal direction to a retracted position within the brake housing 10 (as more fully described below). As the spring retraction plate/diaphragm/sleeve assembly moves to the retracted position, spring 34 is compressed and the volume defined by the spring chamber 30 decreases while the volume of the brake chamber 45 increases.

Figure 6:
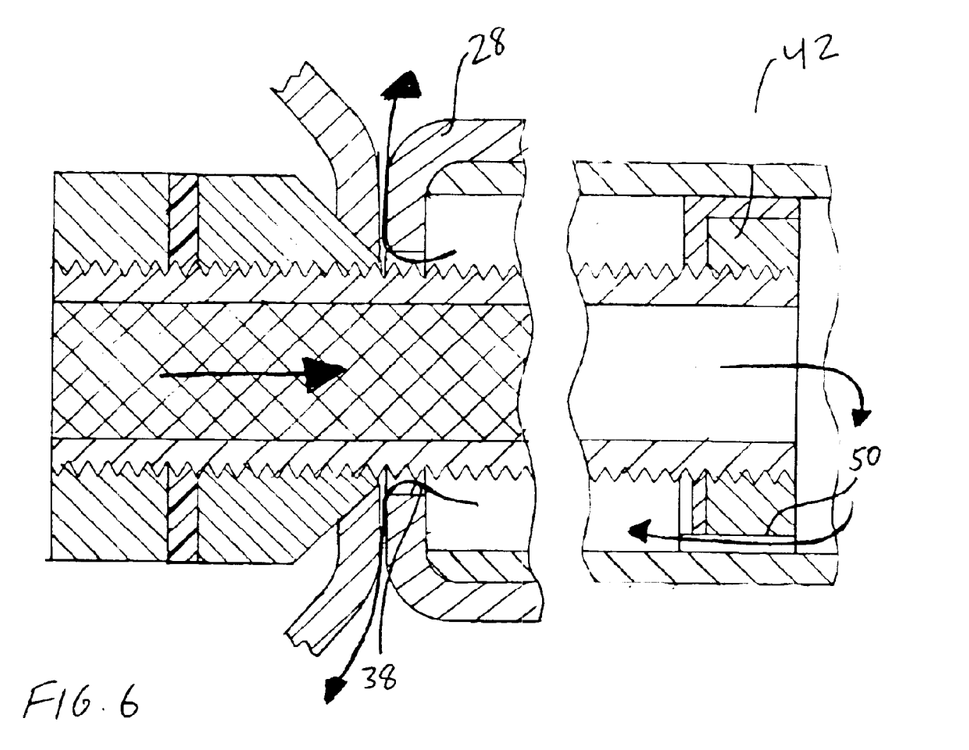
FIG. 6 is an enlarged cross-sectional view showing the fluid path around the ends at the release bolt and brake sleeve of the brake actuator assembly of FIG. 1.

As the volume of the spring chamber 30 decreases, fluid in the first chamber is forced out of the first chamber through an opening 38 in the spring retraction plate/diaphragm/sleeve assembly (as best seen in FIG. 6), as more fully described below. The fluid being forced out of the spring chamber 30 travels through opening 38 and down inside sleeve 20 between sleeve 20 and a release bolt 40. The fluid then passes through the fluid passage 50 which is at least partially defined by collar 42 and exits housing 10 by passing through fluid passage 44 and out through filter element 46. Preferably, chamber 45 is substantially air-tight with respect to the environment outside brake housing 10 except for fluid passage 44.

Alternatively, when pressure in the brake chamber 45 decreases and spring 34 expands, the volume defined by the spring chamber 30 increases while the volume of the brake chamber 45 decreases. As the volume in spring chamber 30 increases the fluid or air pressure in the chamber decreases and a vacuum is created. This vacuum effect causes fluid (i.e., air) from the environment outside the brake housing 10 to be drawn in through the fluid passage 44 in release bolt 40, through filter element 46, through fluid passage 50 in collar 42, between release bolt 40 and sleeve 20, through opening 38 and into first chamber 30 (as best seen in FIG. 6).

Those skilled in the art will recognize there are various other fluid paths that could be conceived connecting spring chamber 30 with the environment outside the brake housing 10 that include the use of a filter element with in the release bolt 40.

Figure 2:
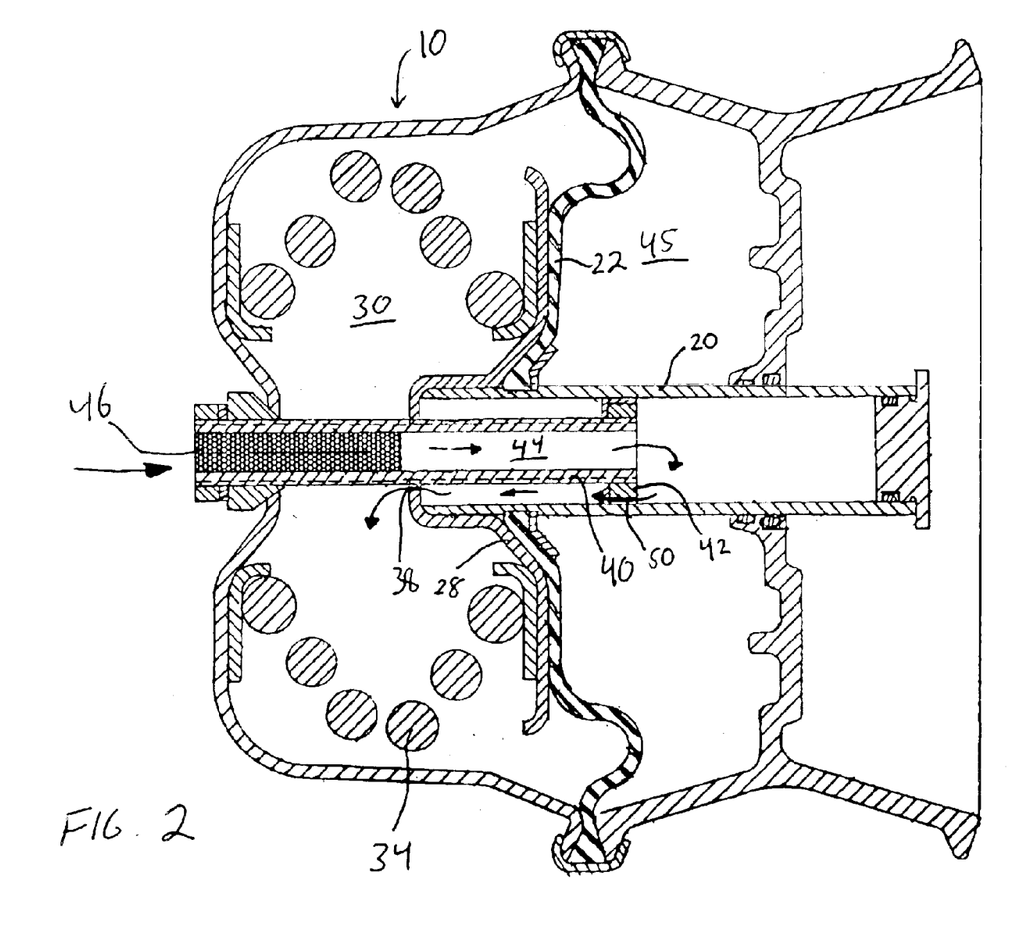
FIG. 2 is a cross-sectional view of the brake actuator assembly of FIG. 1 showing the release bolt in a fully disengaged position and with the power spring partially compressed by air applied to the pressure side of the diaphragm.

A better understanding of the fluid flow through filter 46 can be gained by reviewing the other figures. While FIG. 1 illustrates the situation when brake chamber 45 is fully pressurized, spring 34 is fully compressed and sleeve 20 is in its most retracted position within housing 10 (i.e., release bolt 40 is in a fully disengaged position), FIG. 2 discloses the situation when the pressure in the brake chamber 45 is reduced, permitting spring 34 to partially expand, forcing sleeve 20 in a distal direction to a partially extended position. As pressure in brake chamber 45 is reduced the diaphragm 22 moves distally, decreasing the volume of brake chamber 45 and increasing the volume of spring chamber 30. The increasing volume of brake chamber 45 creates a vacuum, drawing fluid such as ambient air from outside housing 10. The arrows in FIG. 2 show the path of the fluid drawn in from outside housing 10. First, the fluid is drawn into release bolt 40, through filter element 46. As the fluid is drawn through the release bolt 40, filter element 46 filters out any unwanted contaminants such as dirt, grease, moisture or any other undesirable material not wanted within the brake chambers. After passing through the filter 46 and fluid passage 44 in the release bolt 40, the fluid passes through fluid passage 50, in or around collar 42, and travels between sleeve 20 and release bolt 40 until is passes through opening 38 into the spring chamber 30. As the diaphragm 22 continues to move distally the volume in spring chamber 30 continues to expand and continues to draw in more fluid. This flow of fluid is seen even more clearly in FIG. 6.

Figure 3:
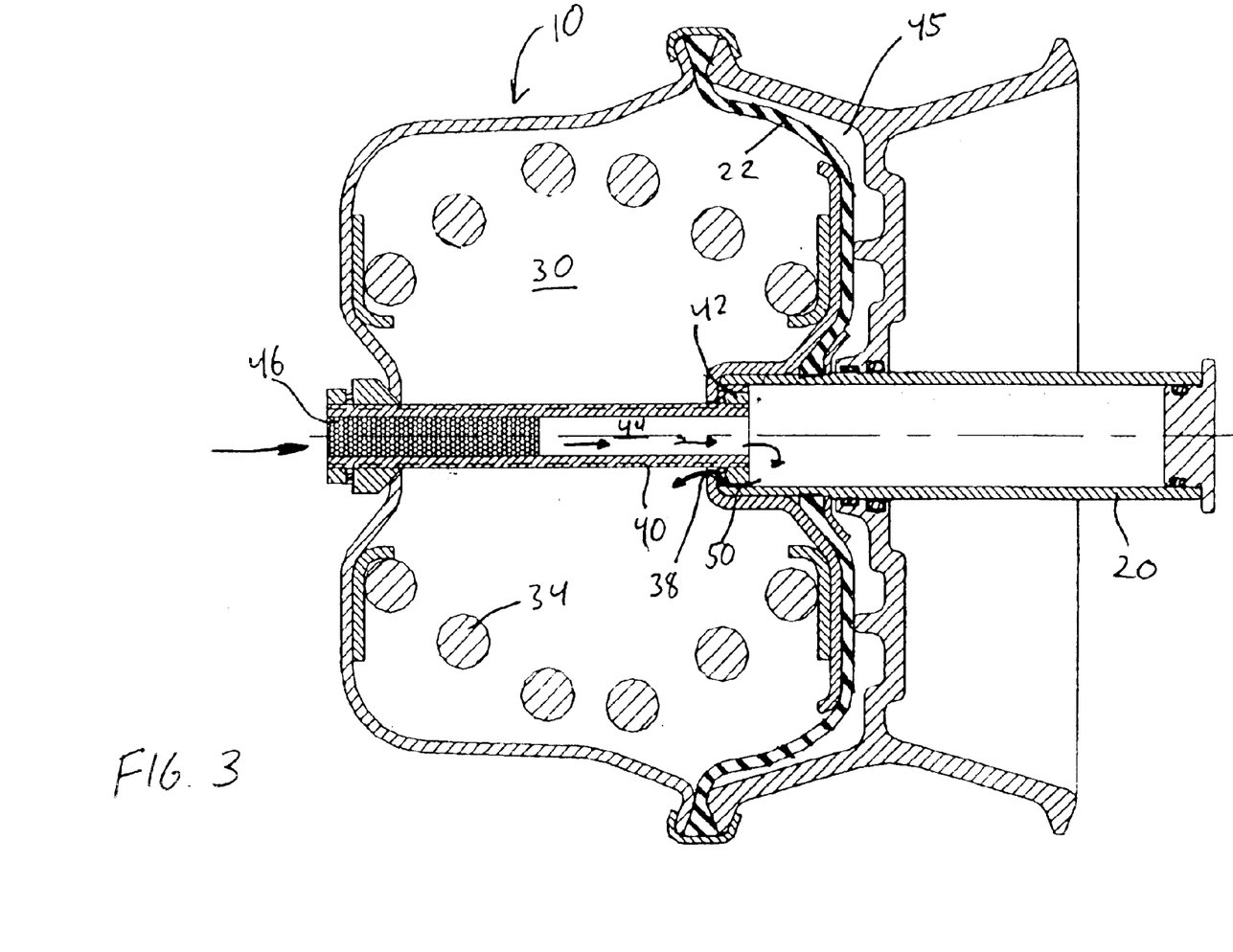
FIG. 3 is a cross-sectional view of the brake actuator assembly of FIG. 1 showing the release bolt in a fully disengaged position and with the power spring in a fully extended position.

FIG. 3 illustrates the situation when the pressure in the brake chamber 45 has been completely released or loss, permitting spring 34 to fully expand, and forcing sleeve 20 in a distal direction to a fully extended position outside housing 10. Diaphragm 22 is in its most distal position minimizing the volume of brake chamber 45 and maximizing the volume of spring chamber 30. The increased volume of spring chamber 30 is filled with ambient air from outside housing 10. The arrows in FIG. 3 show the path of the fluid drawn in from outside housing 10. Again the fluid, such as ambient air is drawn into release bolt 40, through filter element 46. As the fluid, or ambient air is drawn through the release bolt 40, filter element 46 filters out any unwanted contaminants such as dirt, grease, moisture or any other undesirable material not wanted within the brake chambers. After passing through the filter 46 and fluid passage 44 in the release bolt 44, the fluid passes through fluid passage 50, in or around collar 42, and through opening 38 into the spring chamber 30. The situation shown in FIG. 3 would occur, for example, when the spring brake is actuated or in an emergency brake situation when air pressure is lost in brake chamber 45.

Figure 4:
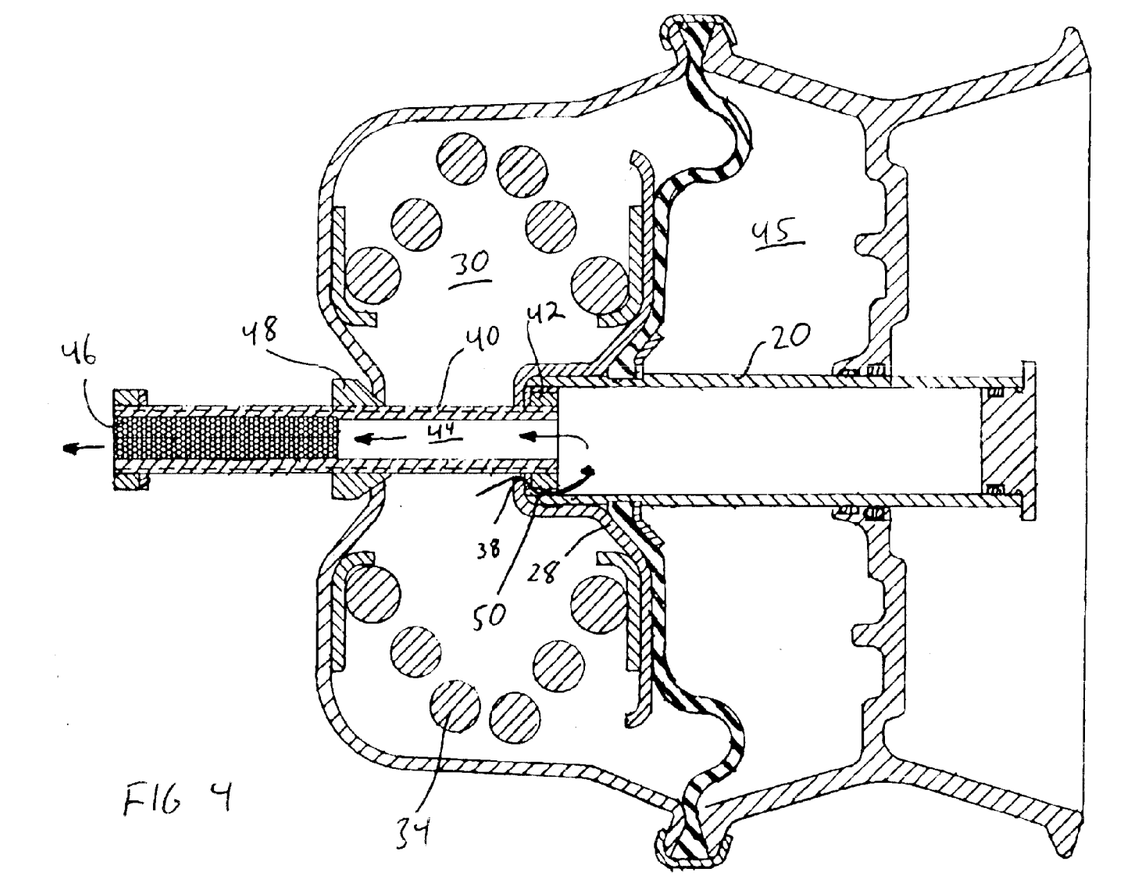
FIG. 4 is a cross-sectional view of the brake actuator assembly of FIG. 1 showing the release bolt in a partially engaged position and with the power spring partially caged by the release bolt.

FIG. 4 shows the situation where the release bolt 40 is in a partially engaged position and with the spring 34 partially caged by the release bolt 40. More specifically, release bolt 40 has been rotated within fixed nut 48 causing release bolt 40 to move in a proximal direction and to further extend outside housing 10. As release bolt 40 is rotated and moved in a proximal direction collar 42 acts upon the spring retraction plate/diaphragm/sleeve assembly to move it in a proximal direction, thereby compressing spring 34. As spring 34 is compressed the volume of the spring chamber 30 decreases, fluid in the spring chamber 30 is forced out of the spring chamber through opening 38 in the spring retraction plate 28. The fluid being force out of the first chamber travels through opening 38, through fluid passage 50 in collar 42 inside sleeve 20 and exits housing 10 by passing through fluid passage 44 and out through filter element 46 of release bolt 40. The arrows in FIG. 4 show the path of the fluid from inside spring chamber 30 to outside housing 10. As the release bolt 40 continues its rotation and continues to further extend out of housing 10 the volume of spring chamber 30 continues to be reduced further forcing air or fluid out of the spring chamber 30.

It should be noted that the extension of release bolt 40 outside of housing 10 when spring 34 is being caged provides a mechanism whereby it can be easily visually determined whether spring 34 has been partially or fully caged by release bolt 40. Moreover, as should be understood by those skilled in the art, the extent to which release bolt 40 extends out of housing 40 indicates the extent to which spring 34 has been caged thereby.

Figure 5:
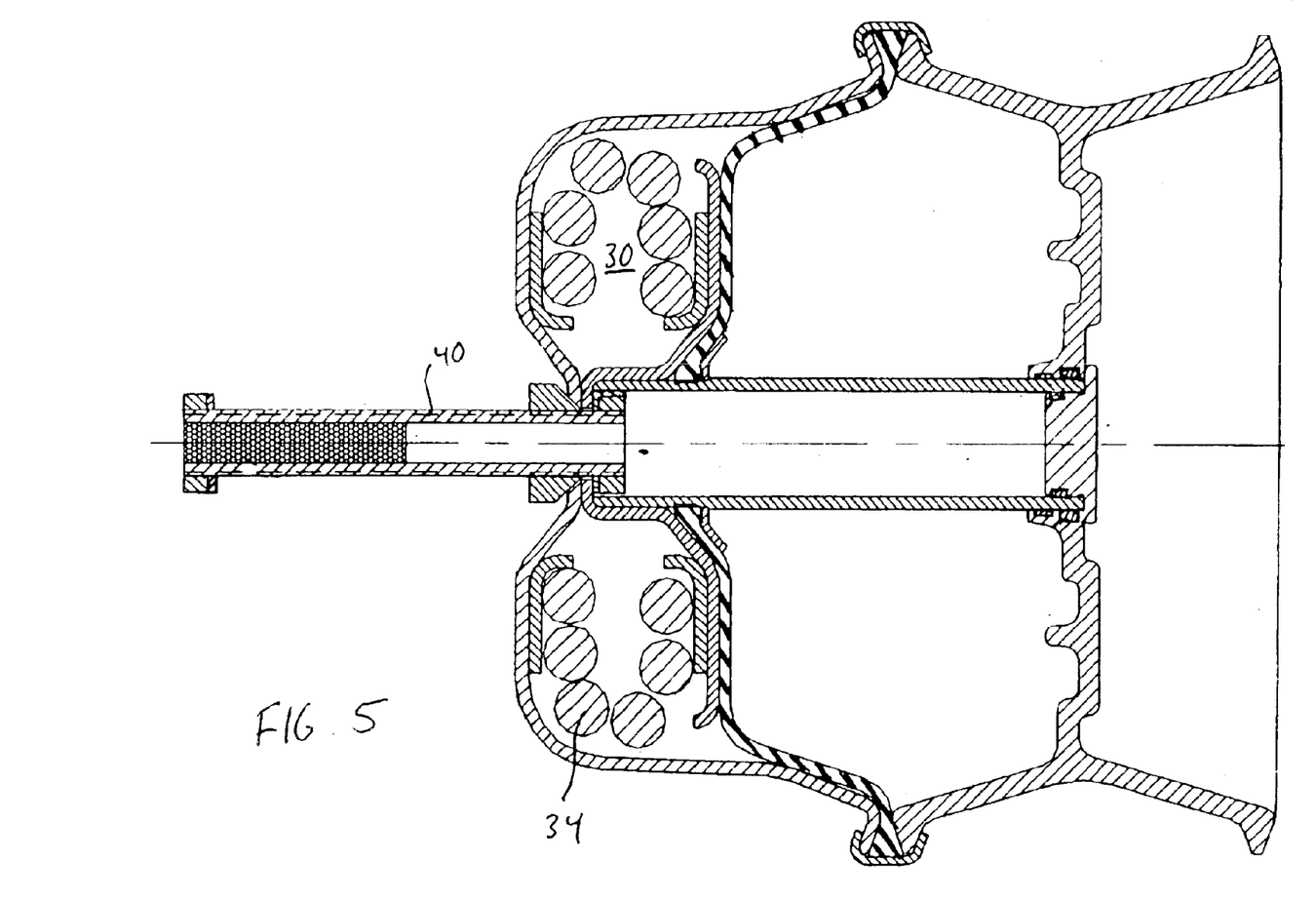
FIG. 5 is a cross-sectional view of the brake actuator assembly of FIG. 1 showing the release bolt in a fully engaged position and with the power spring fully caged by the release bolt.

FIG. 5 shows release bolt 40 completely extended from housing 10 and completely compressing and caging spring 34. The volume of spring chamber 30 is at its minimum. Any increase in the volume of spring chamber 30 due to movement of the diaphragm will require additional air or fluid to enter into the spring chamber 30.

FIG. 6 shows an enlarged detailed view of one embodiment of opening 38 in the spring retraction plate 28 and fluid passage 50 in collar 42. The arrows show the fluid path through these passages as fluid is being drawn into spring chamber 32, as would be the case with the situation described above with respect to FIG. 2. The fluid flow would be reversed if fluid were being expelled from spring chamber 32.

Figure 7:
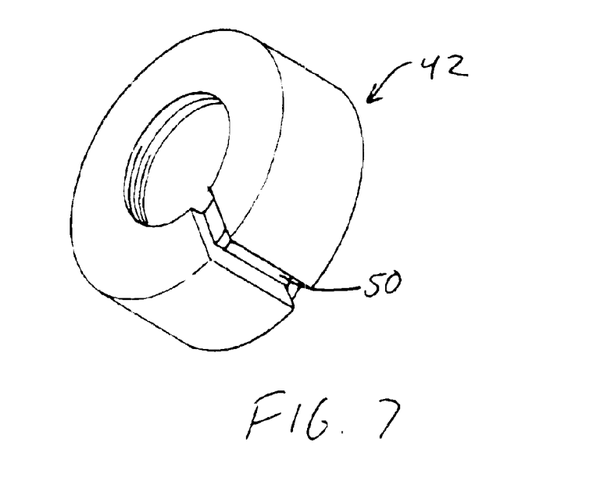
FIG. 7 is an enlarged perspective view of the collar fixed to the end of the release bolt of the brake actuator assembly of FIG. 1.

FIG. 7 shows an enlarged detailed view of one embodiment of collar 42 and fluid passage 50. FIG. 7 shows a collar with only a single groove defining a single fluid passage. Those skilled in the art recognize that collar 42 could have any number of grooves or channel arrangements that would permit fluid flow around or through collar 42.

The present invention, therefore, provides a brake actuator assembly which permits air flow in and out of the actuator brake housing, which filters out unwanted contaminants from entering the actuator brake housing, which does not employ a complex filter design, which does not require that additional holes be created in the housing, and which achieves satisfactory filtering of contaminants.

Although the invention has been described with reference to a particular arrangement of parts, features and the like, these are not intended to exhaust all possible arrangements or features, and indeed many other modifications and variations will be ascertainable to those of skill in the art.

For example, the present invention could easily be adapted by one having ordinary skill in the art for use with substantially any brake actuator assembly which includes a release bolt, such as the brake actuator assembly disclosed in U.S. Pat. No. 5,632,192 to Plantan et al.

What is claimed is:

1. A brake actuator assembly comprising:
   a housing defining a spring chamber;
   a spring disposed in the spring chamber, said spring biased toward an extended position and movable against the bias toward a caged position;
   a release assembly for selectively moving and retaining said spring against the bias toward the caged position, said release assembly comprising a hollow release bolt having a fluid passage passing therethrough by which fluid passage the spring chamber is in fluid communication with an environment surrounding said housing; and
   a filter disposed within the fluid passage in the hollow release bolt for filtering fluid passing through the fluid passage.

2. The brake actuator assembly of claim 1 wherein the spring chamber is substantially air-tight except for the fluid passage in the hollow release bolt.

3. The brake actuator assembly of claim 1 wherein said release assembly comprises threads provided on an outer surface of the hollow release bolt, which threads cooperate with threads provided on an inner surface of a nut.

4. The brake actuator assembly of claim 3 wherein said spring is moved and retained toward the caged position when said hollow release bolt is rotated with respect to the nut.

5. The brake actuator assembly of claim 4 wherein the nut is fixedly mounted to said housing.

6. The brake actuator assembly of claim 1 further comprising an indicator mechanism which indicates whether said spring has been moved and retained toward the caged position.

7. The brake actuator assembly of claim 6 wherein the indicator mechanism indicates to what extent said spring has been moved and retained toward the caged position.

8. The brake actuator assembly of claim 6 wherein the indicator mechanism comprises threads provided on an outer surface of the hollow release bolt, which threads cooperate with threads provided on an inner surface of a nut.

9. The brake actuator assembly of claim 8 wherein the nut is fixedly mounted to said housing.

10. The brake actuator assembly of claim 9 wherein the hollow release bolt extends out beyond said housing when said spring has been moved and retained toward the caged position.

11. The brake actuator assembly of claim 10 wherein an extent to which the hollow release bolt extends out beyond said housing indicates an extent to which said spring has been moved and retained toward the caged position.

12. A brake actuator assembly comprising:
    a housing defining a spring chamber;
    a spring disposed in the spring chamber, said spring biased toward an extended position and movable against the bias toward a caged position;
    a release assembly for selectively moving and retaining said spring against the bias toward the caged position, said release assembly comprising a hollow release bolt having a fluid passage passing therethrough by which fluid passage the spring chamber is in fluid communication with an environment surrounding said housing, the hollow release bolt also having threads provided on an outer surface thereof, which threads cooperate with threads provided on an inner surface of a nut;
    wherein said spring is moved and retained toward the caged position when said hollow release bolt is rotated with respect to the nut;
    an indicator mechanism which indicates whether said spring has been moved and retained toward the caged position; and
    a filter disposed within the fluid passage in the hollow release bolt for filtering fluid passing through the fluid passage.

13. The brake actuator assembly of claim 12 wherein the spring chamber is substantially air-tight except for the fluid passage in the hollow release bolt.

14. The brake actuator assembly of claim 12 wherein the nut is fixedly mounted to said housing.

15. The brake actuator assembly of claim 12 wherein said indicator mechanism indicates to what extent said spring has been moved and retained toward the caged position.

16. The brake actuator assembly of claim 12 wherein said indicator mechanism is operative by cooperation of the threads provided on the outer surface of the hollow release bolt with the threads provided on the inner surface of the nut.

17. The brake actuator assembly of claim 16 wherein the hollow release bolt extends out beyond said housing when said spring has been moved and retained toward the caged position.

18. The brake actuator assembly of claim 17 wherein an extent to which the hollow release bolt extends out beyond said housing indicates an extent to which said spring has been moved and retained toward the caged position.

* * * * *